(12) United States Patent
Matsuya et al.

(10) Patent No.: US 11,239,489 B2
(45) Date of Patent: Feb. 1, 2022

(54) ZINC SECONDARY BATTERY

(71) Applicant: NGK INSULATORS, LTD., Nagoya (JP)

(72) Inventors: Junki Matsuya, Nagoya (JP); Yuichi Gonda, Nagoya (JP); Takeshi Yagi, Nagoya (JP); Kenshin Kitoh, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/828,321

(22) Filed: Mar. 24, 2020

(65) Prior Publication Data
US 2020/0227773 A1 Jul. 16, 2020

Related U.S. Application Data

(63) Continuation of application No. PCT/JP2018/035667, filed on Sep. 26, 2018.

(30) Foreign Application Priority Data

Oct. 20, 2017 (JP) .............................. JP2017-203766

(51) Int. Cl.
*H01M 10/04* (2006.01)
*H01M 4/42* (2006.01)
(Continued)

(52) U.S. Cl.
CPC ......... *H01M 10/0468* (2013.01); *H01M 4/42* (2013.01); *H01M 4/48* (2013.01);
(Continued)

(58) Field of Classification Search
CPC ........ H01M 10/04; H01M 10/28; H01M 4/48; H01M 4/42; H01M 4/86
See application file for complete search history.

(56) References Cited

U.S. PATENT DOCUMENTS

| 2,906,802 A * | 9/1959 | Andre ................... | H01M 10/34 429/149 |
| 2005/0003270 A1* | 1/2005 | Phillips ................. | H01M 10/30 429/223 |

(Continued)

FOREIGN PATENT DOCUMENTS

| JP | 62-126566 A1 | 6/1987 |
| JP | 2015-022843 A1 | 2/2015 |

(Continued)

OTHER PUBLICATIONS

International Search Report and Written Opinion (Application No. PCT/JP2018/035667) dated Nov. 6, 2018 (with English translation).

*Primary Examiner* — Kenneth J Douyette
(74) *Attorney, Agent, or Firm* — Burr & Brown, PLLC

(57) ABSTRACT

There is provided a secondary zinc battery including: (a) at least one unit cell including; a positive electrode; a negative-electrode structure including a negative-electrode active material layer containing at least one selected from the group consisting of elemental zinc, zinc oxide, zinc alloys, and zinc compounds; a LDH separator including a porous substrate composed of a polymeric material and layered double hydroxide (LDH); and an electrolytic solution; and (b) a pressuring unit compacting the unit cell to bring the negative-electrode structure in close contact with the LDH separator. Pores of the porous substrate are filled with the LDH such that the LDH separator is hydroxide-ion-conductive and gas-impermeable. The LDH separator separates the positive electrode from the negative-electrode active material layer.

14 Claims, 8 Drawing Sheets

(51) Int. Cl.
*H01M 4/48* (2010.01)
*H01M 4/66* (2006.01)
*H01M 10/28* (2006.01)
*H01M 50/446* (2021.01)
*H01M 4/02* (2006.01)

(52) U.S. Cl.
CPC ........... *H01M 4/661* (2013.01); *H01M 10/28* (2013.01); *H01M 50/446* (2021.01); *H01M 2004/027* (2013.01)

(56) References Cited

U.S. PATENT DOCUMENTS

| | | | | |
|---|---|---|---|---|
| 2007/0292758 | A1* | 12/2007 | Uchida | H01M 4/52 |
| | | | | 429/223 |
| 2011/0086248 | A1* | 4/2011 | Nakura | H01M 50/20 |
| | | | | 429/9 |
| 2011/0195321 | A1* | 8/2011 | Takahashi | H01M 4/382 |
| | | | | 429/403 |
| 2012/0244429 | A1* | 9/2012 | Lam | H01G 11/26 |
| | | | | 429/211 |
| 2014/0315099 | A1 | 10/2014 | Yamada et al. | |
| 2016/0268568 | A1* | 9/2016 | Asai | B32B 5/18 |
| 2016/0276714 | A1 | 9/2016 | Hayashi et al. | |
| 2017/0077476 | A1 | 3/2017 | Kitoh et al. | |
| 2017/0214019 | A1 | 7/2017 | Yokoyama et al. | |
| 2017/0271731 | A1 | 9/2017 | Hayashi et al. | |

FOREIGN PATENT DOCUMENTS

| | | |
|---|---|---|
| JP | 2016-129156 A1 | 7/2016 |
| JP | 2017-098107 A1 | 6/2017 |
| WO | 2013/118561 A1 | 8/2013 |
| WO | 2016/067884 A1 | 5/2016 |
| WO | 2016/076047 A1 | 5/2016 |
| WO | 2016/088673 A1 | 6/2016 |
| WO | 2017/110285 A1 | 6/2017 |

\* cited by examiner

ZINC SECONDARY BATTERY

CROSS-REFERENCE TO RELATED APPLICATIONS

This application is a continuation application of PCT/JP2018/035667 filed Sep. 26, 2018, which claims priority to Japanese Patent Application No. 2017-203766 filed Oct. 20, 2017, the entire contents all of which are incorporated herein by reference.

BACKGROUND OF THE INVENTION

1. Field of the Invention

The present invention relates to a secondary zinc battery.

2. Description of the Related Art

In secondary zinc batteries, for example, secondary nickel-zinc batteries and secondary air-zinc batteries, it is known that metallic zinc dendrites precipitates on negative electrodes during a charge mode, penetrates through voids in separators, for example, non-woven fabrics and reach positive electrodes, resulting in short circuiting. Short circuiting caused by such zinc dendrites leads to a reduction in charge and discharge repetition lifetime of the secondary zinc batteries.

In order to solve such a problem, secondary zinc batteries have been proposed that include layered double hydroxide (LDH) separators selectively permitting the migration of hydroxide ions while blocking zinc dendrites. For example, Patent Document 1 (WO2013/118561) discloses a secondary nickel-zinc battery including a LDH separator disposed between a positive electrode and a negative electrode. Patent Document 2 (WO2016/076047) discloses a separator structure including a LDH separator that is fitted in or joined to a resin frame and has high denseness enough to inhibit permeation of gas and/or water. Patent Document 2 also discloses that the LDH separator may be a composite with a porous substrate. Patent Document 3 (WO2016/067884) discloses various methods of forming a dense LDH membrane on a porous substrate to give a composite material (LDH separator). The method includes the steps of: evenly depositing a starting material on a porous substrate to provide a start point of the growth of LDH crystals; and subjecting the porous substrate to a hydrothermal treatment in an aqueous stock solution for formation of the dense LDH membrane on the porous substrate.

CITATION LIST

Patent Literatures

Patent Document 1: WO2013/118561
Patent Document 2: WO2016/076047
Patent Document 3: WO2016/067884

SUMMARY OF THE INVENTION

A secondary zinc battery, for example, a secondary nickel-zinc battery including a LDH separator is expected to prevent short circuiting caused by zinc dendrites. Traditional secondary zinc batteries equipped with LDH separators have gaps or spaces that are defined between negative electrodes and the LDH separators and filled with electrolytic solution. The basic concept of the traditional secondary zinc batteries equipped with LDH separators is to block propagation of the zinc dendrites, which grow in the gaps or spaces, at LDH separators. In order to more certainly prevent short circuiting caused by the zinc dendrites, however, secondary zinc batteries are advantageous that has a configuration not allowing the zinc dendrites to grow between negative electrodes and LDH separators.

The present inventors have discovered that by employing a LDH separator including a polymeric porous substrate and compacting a unit cell in a predetermined direction, it is possible to minimize the gap allowing zinc dendrite growth between the negative electrode and the LDH separator so as to provide a secondary zinc battery (particularly, a stacked-cell battery) that can more effectively block the propagation of the zinc dendrites.

An object of the present invention is to provide a secondary zinc battery (particularly, a stacked-cell battery) that can minimize the gap allowing zinc dendrite growth between the negative electrode and the LDH separator, and thereby more effectively block the propagation of the zinc dendrites.

According to an aspect of the present invention, there is provided a secondary zinc battery comprising:
  (a) at least one unit cell comprising;
    a positive electrode;
    a negative-electrode structure comprising a negative-electrode active material layer comprising at least one selected from the group consisting of elemental zinc, zinc oxide, zinc alloys, and zinc compounds;
    a layered double hydroxide (LDH) separator comprising a porous substrate composed of a polymeric material and LDH, pores of the porous substrate being filled with the LDH such that the LDH separator is hydroxide-ion-conductive and gas-impermeable, the LDH separator separating the positive electrode from the negative-electrode active material layer; and
    an electrolytic solution; and
  (b) a pressuring unit compacting the unit cell to bring the negative-electrode structure in close contact with the LDH separator.

DETAILED DESCRIPTION OF THE INVENTION

Secondary Zinc Battery

A secondary zinc battery of the present invention may be of any type including zinc in a negative electrode and containing an alkali electrolytic solution (typically an aqueous alkali metal hydroxide solution). Thus, the secondary zinc battery of the invention may be a secondary nickel-zinc battery, a secondary silver oxide-zinc battery, a secondary manganese oxide-zinc battery, a secondary zinc-air battery, or any other type of secondary alkaline zinc battery. For example, the secondary zinc battery is preferably a secondary nickel-zinc battery including a positive electrode comprising nickel hydroxide and/or nickel oxyhydroxide. Alternatively, the secondary zinc battery may be a secondary zinc-air battery including a positive air electrode.

Figure 1A:
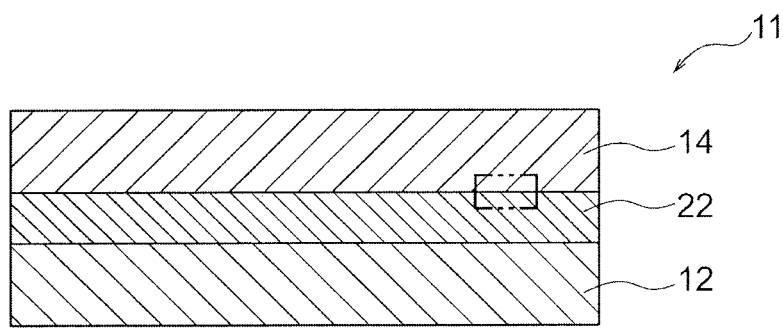
FIG. 1A is a schematic cross-sectional view illustrating a layered configuration of a unit cell of a secondary zinc battery of the present invention.
Figure 1B:
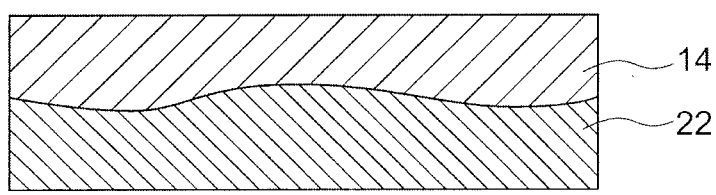
FIG. 1B is a conceptual schematic cross-sectional view illustrating an interfacial structure of a portion surrounded by a dotted line of the unit cell in FIG. 1A.
Figure 2:
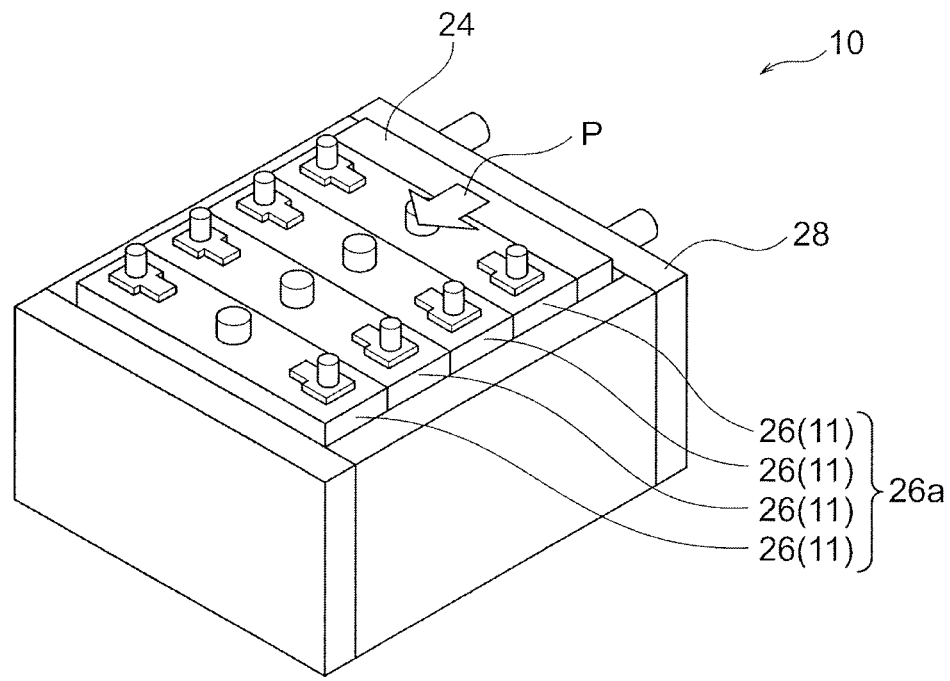
FIG. 2 is a schematic perspective view illustrating an exemplary secondary zinc battery of the present invention.
Figure 3:
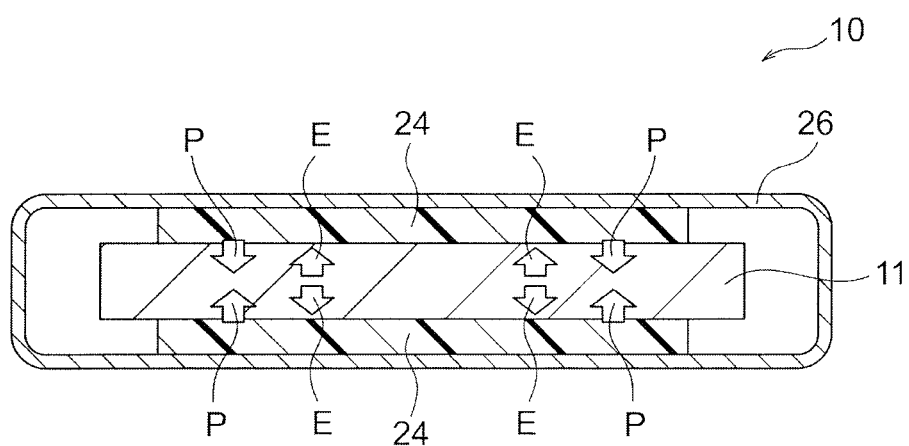
FIG. 3 is a schematic cross-sectional view illustrating another exemplary secondary zinc battery of the invention.
Figure 4:
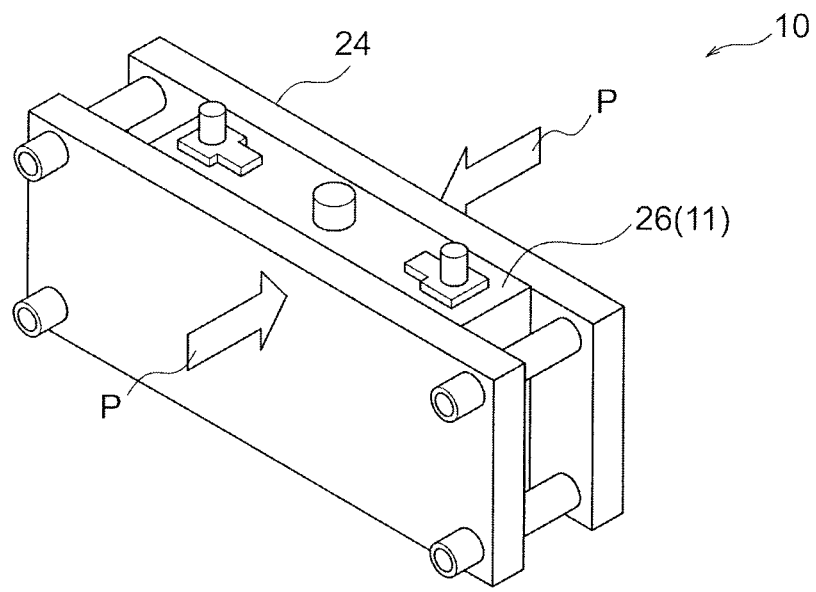
FIG. 4 is a schematic perspective view of another exemplary secondary zinc battery of the invention.

The secondary zinc battery of the invention includes at least one unit cell and at least one pressuring means. While FIGS. 1A and 1B illustrate a layered configuration of a unit cell 11, FIGS. 2 to 4 illustrate a secondary zinc battery 10 including one or more unit cells 11 and one or more pressuring means 24. As illustrated in FIGS. 1A and 1B, each unit cell 11 includes a positive electrode 12, a negative-electrode structure 14, and a LDH separator 22 and contains an electrolytic solution (not shown). The negative-electrode structure 14 includes a negative-electrode active material layer containing at least one selected from the group consisting of elemental zinc, zinc oxide, zinc alloys, and zinc compounds. The LDH separator 22 comprises a porous substrate composed of a polymeric material and contains layered double hydroxide (LDH). The pores in the substrate are filled with the LDH such that the LDH separator 22 has hydroxide ion conductivity and gas-impermeability. Throughout this specification, the term "LDH separator" refers to a separator that contains LDH and permits selective migration of hydroxide ions due to the hydroxide-ion conductivity of the LDH. The LDH separator 22 separates the positive electrode 12 from the negative-electrode active material layer constituting the negative-electrode structure 14. As illustrated in FIGS. 2 to 4, the one or more pressuring means 24 compact the one or more unit cells 11 such that the negative-electrode structure 14 comes into close contact with the LDH separator 22. By employing the LDH separator 22 including the polymeric porous substrate and compacting the unit cell 11 of the secondary zinc battery in a predetermined direction, it is possible to minimize or eliminate the gap allowing zinc dendrite growth between the negative electrode and the LDH separator so as to provide a secondary zinc battery (in particular, a stacked-cell battery) that can more effectively block the propagation of the zinc dendrites.

Figure 11A:
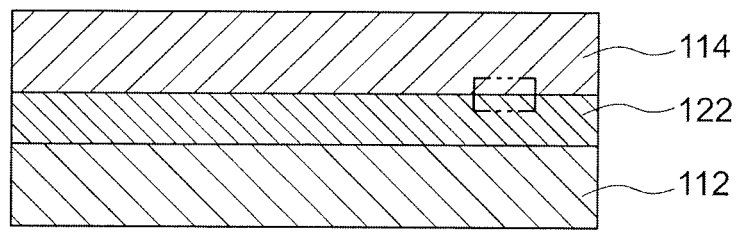
FIG. 11A is a schematic cross-sectional view illustrating a layered configuration of a unit cell of a traditional secondary zinc battery.
Figure 11B:
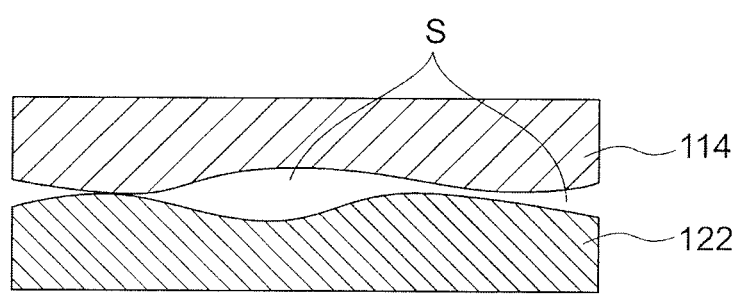
FIG. 11B is a conceptual schematic cross-sectional view illustrating an interfacial structure of a portion surrounded by a dotted line of the unit cell in FIG. 11A.

As described above, traditional secondary zinc batteries equipped with LDH separators have gaps or spaces that are defined between negative electrodes and LDH separators and filled with electrolytic solution. The basic concept of the traditional secondary zinc batteries equipped with the LDH separators is to block the propagation of zinc dendrites, which grow in the gaps or spaces, at the LDH separators. In order to more certainly prevent short circuiting caused by the zinc dendrites, however, a secondary zinc battery is advantageous that has a configuration not allowing the zinc dendrites to grow between the negative electrode and the LDH separator. The LDH separators or composite members disclosed in Examples in Patent Documents 2 and 3 are based on porous substrates composed of hard ceramics, for example, alumina and zirconia. Thus, a traditional configuration including a positive electrode 112, a LDH separator 122 composed of a hard ceramic, and a negative electrode 114 as illustrated in FIG. 11A is likely to have a gap S defined between the LDH separator 122 and the negative electrode 114 as illustrated in FIG. 11B. This gap (that is to be filled with an electrolytic solution) allows the growth and propagation of zinc dendrites. The zinc dendrites propagating in the gap S are ideally blocked by the LDH separator 122. The LDH separator 122, however, may allow the zinc dendrites to penetrate through the gap S if the LDH separator 122 has some defects or fragile portions. In contrast, the LDH separator 22 employed in the present invention includes a polymeric porous substrate that is more flexible than a ceramic porous substrate and thus is readily deformable by pressure. The unit cell 11 including such a LDH separator 22 is compacted by the pressuring means 24 in a predetermined direction. The gap defined between the LDH separator 22 and the negative-electrode structure 14 can be thereby minimized or preferably removed as illustrated in FIG. 1B. In other words, the LDH separator 22 is deformed so as to fit to the surface asperities of the negative-electrode structure 14. As a result, the LDH separator 22 comes into close contact with the negative-electrode structure 14. Thus, the zinc dendrites are unlikely to grow and propagate. As a result, the propagation of the zinc dendrites can be more effectively blocked.

In the secondary zinc battery of the present invention, the LDH separator 22 can come into close contact with the negative-electrode structure 14 and thus provides the following advantages:

The LDH separator 22 in close contact with the negative-electrode structure 14 enables the pressuring means 24 to evenly compact the negative-electrode structure 14. As a result, the negative-electrode active material layer of the negative-electrode structure 14 can be effectively used for a charge or discharge reaction. This also applies to the positive electrode 12.

The LDH separator 22 in close contact with the negative-electrode structure 14 reduces the cell resistance, resulting in an improvement in performance of a battery. This also applies to the positive electrode 12.

The LDH separator based on a polymeric porous substrate is break-proofed, resulting in facilitated assembly of a battery (for example, assembly of electrode groups and placement of the electrode groups into a case).

(a) Unit Cell

A unit cell 11 includes a positive electrode 12, a negative-electrode structure 14, a LDH separator 22, and an electrolytic solution (not shown).

The positive electrode 12 may be composed of any appropriately selected known material according to the type of a secondary zinc battery. For example, a positive electrode comprising nickel hydroxide and/or nickel oxyhydroxide may be used in a secondary nickel-zinc battery; or an air positive electrode may be used in a secondary zinc-air battery. The positive electrode 12 is preferably provided with a collector (not shown). Preferred examples of the positive-electrode collector include porous nickel substrates, for example, foamed nickel plates. In this case, a porous nickel substrate is evenly coated with, for example, a paste containing an electrode active material, such as nickel hydroxide, and is then dried into a preferred platy positive electrode provided with a collector. Preferably, the dried platy positive electrode with the collector is compacted to prevent the detachment of the electrode active material and to increase the density of the electrode. In the secondary zinc battery of the present invention, compaction of the positive electrode 12 with the pressuring means 24 can also prevent the detachment of the electrode active material and increase the density of the electrode.

Figure 5A:
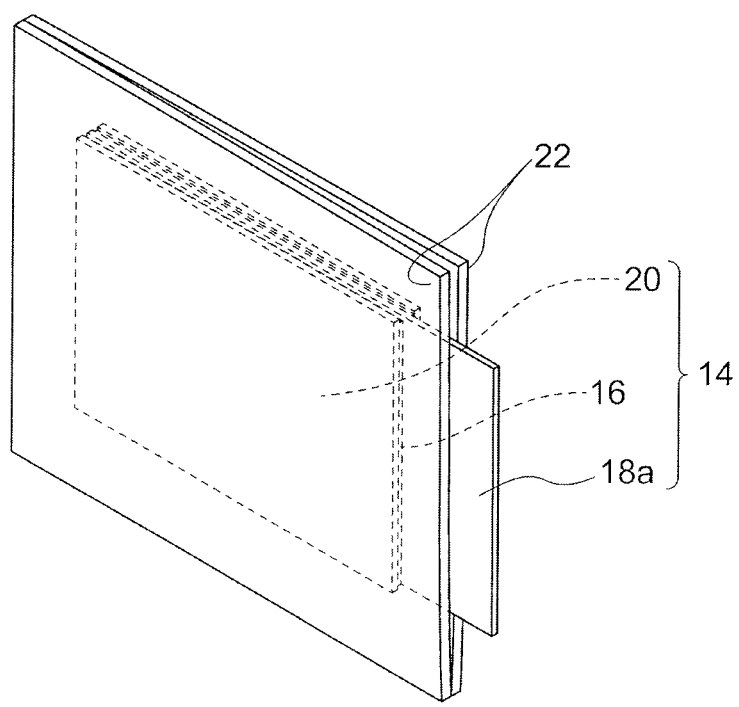
FIG. 5A is a perspective view illustrating an exemplary negative-electrode structure covered with a LDH separator of the secondary zinc battery of the invention.
Figure 5B:
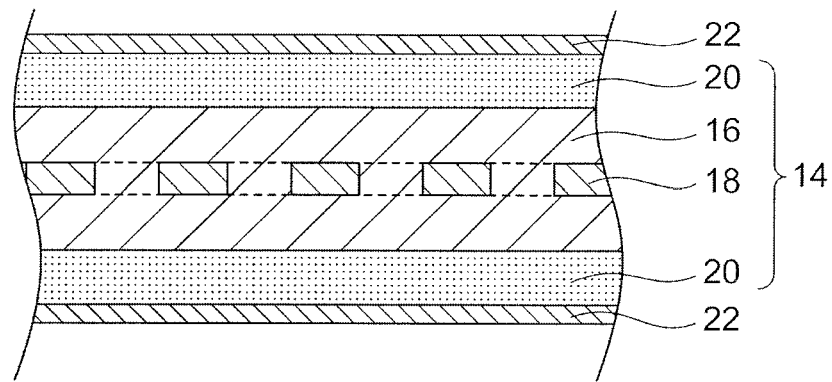
FIG. 5B is a schematic cross-sectional view illustrating a layered configuration of the negative-electrode structure covered with the LDH separator in FIG. 5A.

Any negative-electrode structure 14 that includes a negative-electrode active material layer may be used. The negative-electrode structure 14 may include only the negative-electrode active material layer. Alternatively, the negative-electrode structure 14 may further include other components, for example, a current collector and a liquid retention material. FIGS. 5A and 5B illustrate a preferred embodiment of the negative-electrode structure 14. The negative-electrode structure 14 illustrated in FIGS. 5A and 5B includes a negative-electrode active material layer 16, a current collector 18, and a liquid retention material 20. The entire negative-electrode active material layer 16 is covered with or wrapped by a LDH separator 22 with the intervention of the liquid retention material 20. Since the entire negative-electrode active material layer 16 is covered with or wrapped by the liquid retention material 20 and the LDH separator 22, a troublesome process is unnecessary that involves joining the LDH separator 22 with a resin frame and sealing a battery container. Thus, a negative-electrode structure contributes to significantly ready and highly productive manufacturing of a secondary zinc battery (particularly, a stacked-cell battery) capable of blocking the propagation of zinc dendrites. Separation of a positive electrode and a negative electrode by a LDH separator in a traditional secondary zinc battery is achieved by a complicated and burdensome process involving joining the LDH separator with a resin frame and sealing a battery container with an adhesive such that the liquid tightness is ensured. Thus, the battery configuration and the production process are likely to be complicated. Such a complicated battery configuration and process can be particularly significant in the case of a stacked-cell battery. In the negative-electrode structure 14 of the present embodiment, the entire negative-electrode active material layer 16 is covered with or wrapped by the LDH separator 22. This can prevent short circuiting caused by the zinc dendrites. Since the negative-electrode structure 14 includes the liquid retention material 20, injection of an electrolytic solution into the negative-electrode structure 14 covered with or wrapped by the LDH separator 22 makes it possible to readily configure a negative-electrode chamber of the secondary battery in a form that can block the propagation of the zinc dendrites. In the case that the negative-electrode structure 14 of the present embodiment is employed for manufacturing of a secondary zinc battery, the positive electrode 12 is only assembled with the negative-electrode structure 14 covered with or wrapped by the LDH separator 22. Separation of the positive electrode and the negative electrode by the LDH separator can be achieved thereby. This configuration is significantly advantageous because only alternately stacking of platy positive electrodes and negative-electrode structures can produce a stacked-cell battery including multiple unit cells without use of a complicated and burdensome process in a traditional technique that involves joining the LDH separator with the resin frame and sealing the battery container for separation of the positive electrode and the negative electrode by the LDH separator.

The negative-electrode active material layer 16 contains at least one selected from the group consisting of elemental zinc, zinc oxide, zinc alloys, and zinc compounds. In other words, any form of zinc, for example, elemental zinc, zinc compound, or zinc alloy, that has an electrochemical activity suitable for a negative electrode may be used. Preferred examples of the material for the negative electrode include zinc oxide, elemental zinc, and calcium zincate. A mixture of elemental zinc and zinc oxide is more preferred. The negative-electrode active material layer 16 may be gelled. The negative-electrode active material layer 16 may be composed of a mixture of a negative-electrode active material and an electrolytic solution. For example, addition of an electrolytic solution and a thickener to the negative-electrode active material can readily produce a gelled negative electrode. Examples of the thickener include poly(vinyl alcohol), polyacrylate, carboxymethyl cellulose (CMC), and alginic acid. Poly(acrylic acid) is preferred because it has significant chemical resistance against strong alkalis.

A mercury-free zinc alloy or a lead-free zinc alloy may also be used. For example, a zinc alloy should preferably contain 0.01 to 0.1 mass % indium, 0.005 to 0.02 mass % bismuth, and 0.0035 to 0.015 mass % aluminum to inhibit emission of gaseous hydrogen. In particular, indium and bismuth are advantageous from the viewpoint of an improvement in discharge performance. Use of a zinc alloy in the negative electrode can reduce self-dissolution of the negative electrode in an alkaline electrolytic solution, resulting in reduced emission of gaseous hydrogen and thus enhanced safety.

The material for the negative electrode may have any form but preferably a powder form. The negative electrode thereby has a large surface area and can discharge a large current. A material, composed of a zinc alloy, for the negative electrode preferably has a mean particle size ranging from 3 to 100 μm in minor axis. A negative electrode composed of zinc alloy particles with a mean particle size in such a range has a large surface area and is thus suitable for discharge of a large amount of current. Such a material can be homogeneously mixed with an electrolytic solution and a gelling agent and readily handled during assembly of a battery.

Figure 6:
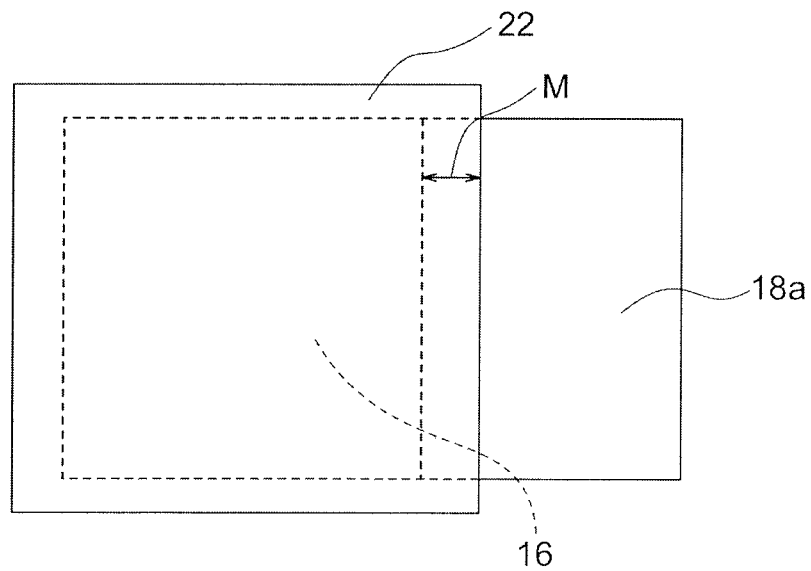
FIG. 6 is a schematic view showing an area of the negative-electrode structure covered with the LDH separator of an exemplary secondary zinc battery of the invention.

It is preferred that the negative-electrode structure 14 further include a current collector 18. The current collector 18 should preferably be in contact with the negative-electrode active material layer 16. In particular, the current collector 18 should preferably have an extension 18a extending from one side of the negative-electrode active material layer 16. One side of the extension 18a should preferably be exposed from the LDH separator 22 and the liquid retention material 20 (if present). The current collector 18 (in particular, the extension 18a) can be preferably connected to a terminal (not shown) of the negative electrode via the exposed side. In this case, a side edge, adjacent to the extension 18*a*, of the negative-electrode active material layer 16 should preferably be covered with or wrapped by the LDH separator 22 with a margin M such that the LDH separator 22 sufficiently hides the side edge, as illustrated in FIG. 6. This can more effectively block the propagation of the zinc dendrites from the side edge, adjacent to the extension 18*a*, of the negative-electrode active material layer 16 or from the neighborhood of the side edge.

Preferred examples of the current collector 18 includes copper foils, expanded copper metals, and punched copper metals. Copper foils and expanded copper metals are more preferred because they are flexible and readily deformable by pressure. For example, a copper foil or an expanded copper metal is coated with a mixture of powdered zinc oxide and/or elemental zinc and a binder (for example, particulate polytetrafluoroethylene) as desired. A preferred platy negative electrode provided with a collector can be thereby produced. Preferably, the dried platy negative electrode with the collector is compacted to prevent the detachment of the electrode active material and to increase the density of the electrode. In the secondary zinc battery of the present invention, the negative-electrode structure 14 compacted with the pressuring means 24 can also prevent the detachment of the electrode active material and increase the density of the electrode.

It is preferred that the negative-electrode structure 14 further includes a liquid retention material 20 that covers or wraps around the negative-electrode active material layer 16. An electrolytic solution can be uniformly distributed between the negative-electrode active material layer 16 and the LDH separator 22, resulting in effective migration of hydroxide ions between the negative-electrode active material layer 16 and the LDH separator 22. The liquid retention material 20 increases the overall flexibility of the negative-electrode structure 14. Thus, the negative-electrode structure 14 can more readily come into close contact with the LDH separator 22. Various advantageous effects of the present invention can be thereby more readily achieved. The liquid retention material 20 may be of any type that can hold an electrolytic solution. The liquid retention material 20 should preferably be sheeted. Preferred examples of the liquid retention material include non-woven fabrics, water-absorbing resins, liquid retaining resins, and porous sheets. The non-woven fabrics are particularly preferred because a low-cost high-performance negative-electrode structure 14 can be produced. The liquid retention material 20 preferably has a thickness of 0.01 to 0.20 mm, more preferably 0.02 to 0.20 mm, further preferably 0.02 to 0.15 mm, particularly preferably 0.02 to 0.10 mm, most preferably 0.02 to 0.06 mm. The liquid retention material 20 having a thickness in such a range can minimize the size of the overall negative-electrode structure 14 while holding a sufficient volume of electrolytic solution.

The LDH separator 22 includes LDH and a porous substrate. As described above, the porous substrate is composed of a polymeric material. The pores of the substrate are filled with the LDH, so that the LDH separator 22 has hydroxide ion conductivity and gas-impermeability (and thus function as the LDH separator exhibiting hydroxide ion conductivity). The LDH separator 22 separates the positive electrode 12 from the negative-electrode active material layer 16. The LDH is preferably incorporated into the porous substrate over the entire thickness thereof. Various preferred embodiments of the LDH separator 22 will be detailed below.

In a typical embodiment, one LDH separator 22 is provided on one side of the negative-electrode structure 14. In detail, one LDH separator 22 is folded onto two sides of the negative-electrode structure 14. Alternatively, two separator segments of the LDH separator 22 are respectively provided on two sides of the negative-electrode structure 14. Alternatively, two or more plies of LDH separators 22 may be provided on the two sides of the negative-electrode structure 14. For example, several plies of LDH separators 22 may cover or wrap around the entire negative-electrode active material layer 16 (that may be covered with or wrapped by the liquid retention material 20).

Typically, the LDH separator 22 has tetragonal planar shape. In this case, the LDH separator 22 preferably has at least two closed edges. The LDH separator 22 can certainly separate the negative-electrode active material layer 16 from the positive electrode 12 after being disposed in the secondary zinc battery and more effectively block the propagation of zinc dendrites. For the negative-electrode structure 14 having the extension 18*a*, the LDH separator 22 is preferably not in contact with the extension 18*a* on the at least two closed edges such that the extension 18*a* can extend to the exterior.

The LDH separator 22 may be open on one or two edges. Even if, for example, the upper edge of the LDH separator 22 are open, an electrolytic solution can be injected so as not to reach the upper edge of the LDH separator during production of the secondary zinc battery. Since the electrolytic solution is below the upper edge of the LDH separator, the leakage of the solution and the propagation of zinc dendrites can be avoided. In this regard, the negative-electrode structure 14 containing the electrolytic solution as well as the positive electrode are accommodated into a closed container or a case 26 and can serve as a main component of a sealed type of secondary zinc battery. The case 26 can eventually ensure the air-tightness of the negative-electrode structure 14; hence, the negative-electrode structure 14 itself may have a simple configuration with an open upper edge. Since the LDH separator 22 is open on one edge, the extension 18*a* can extend therefrom. The extension 18*a* may extend from the upper edge or another edge of the LDH separator 22.

In any case, at least two sides of a LDH separator 22 is sealed with the respective sides of another LDH separator 22, or a LDH separator is folded. Preferred examples of sealing techniques include adhesives, thermal welding, ultrasonic welding, adhesion tapes, sealing tapes, and combination thereof. In particular, the LDH separator 22 including a porous substrate composed of a polymeric material is advantageous in that it is flexible and thus readily foldable. Hence, it is preferred to form an elongated LDH separator 22 and then fold the LDH separator 22 such that one edge of the LDH separator 22 is automatically closed.

The electrolytic solution preferably contains an aqueous alkali metal hydroxide solution. Although not illustrated, the positive electrode 12 and the negative-electrode structure 14 are entirely immersed in the electrolytic solution. Examples of alkali metal hydroxide include potassium hydroxide, sodium hydroxide, lithium hydroxide, and ammonium hydroxide. Potassium hydroxide is more preferred. In order to inhibit self-dissolution of zinc and/or zinc oxide, a zinc compound, for example, zinc oxide or zinc hydroxide may be added to the electrolytic solution. As described above, the electrolytic solution may be mixed with a positive-electrode active material or a negative-electrode active material to yield a mixture of the electrolytic solution and the positive-electrode active material or a mixture of the electrolytic solution and the negative-electrode active material. In order to prevent leakage of the electrolytic solution, the electrolytic solution may be gelled. A polymeric gelling agent is preferably used that absorbs the solvent in the electrolytic solution to swell. For example, a polymer such as polyethylene oxide, poly(vinyl alcohol), or polyacrylamide, or starch is used.

As illustrated in FIGS. 2 to 4, the secondary zinc battery may further include at least one case 26 that accommodates the unit cell 11. Two or more unit cells 11 may be accommodated in the respective cases 26. This is a configuration of a so-called stacked-cell battery and is advantageous in that a high voltage and a large amount of current can be generated. The case 26 accommodating the unit cells 11 is preferably composed of resin. The resin contained in the case 26 preferably has resistance against alkali metal hydroxide, for example, potassium hydroxide and is more preferably polyolefin, acrylonitrile butadiene styrene (ABS), or modified polyphenylene ether, further preferably ABS or modified polyphenylene ether. As illustrated in FIG. 2, a group 26a of two or more arrayed cases 26 may be accommodated in an outer frame 28 to serve as a battery module.

(b) Pressuring Means

As illustrated in FIGS. 2 to 4, the one or more pressuring means 24 compacts one or more unit cells 11 such that the negative-electrode structure 14 comes into close contact with the LDH separator 22. The pressuring means 24 may be of any known type that can compact the unit cells 11 in a predetermined direction. Examples of the pressuring means 24 include spacers (for example, flexible components, such as resin and rubber, and elastic components, such as rubber and springs), stoppers (for example, resin plates and metal plates), fasteners (for example screws, bolts, nuts, and clamps), holders (for example, combination of a stopper and a fastener), any other tool, and combination thereof. In the case that the pressuring means 24 is a spacer, the spacer is preferably disposed in a gap that may be present around the unit cells 11 or the secondary zinc battery (for example, a gap between cases 26 and the outer frame 28 accommodating the cases 26 as illustrated in FIG. 2 or a gap between the unit cell 11 and the inner wall of the case 26 as illustrated in FIG. 3). In the case that the pressuring means 24 is a holder, two metal plates of the holder holds and fasten the case 26 accommodating the unit cell 11 as illustrated in FIG. 4. In any case, compaction by the pressuring means 24 preferably brings the LDH separator 22 into contact with the entire surface of the negative-electrode structure 14 without gaps, as illustrated in FIG. 1B. This can certainly inhibit growth and propagation of zinc dendrites. As a result, prevention of propagation of zinc dendrites and other effects described above can be further enhanced.

As illustrated in FIG. 2, the pressuring means 24 is preferably disposed outside the cases 26 (each accommodating the unit cell 11) to externally press and deflect the cases 26 such that the unit cells 11 are compacted. Since the pressuring means 24 can apply an averaged pressure to the cases 26, the LDH separator 22 comes into contact with the entire surface of the negative-electrode structure 14 (preferably without gaps). Direct contact of the pressuring means 24 with the unit cell 11 can be avoided. Thus, the damage to the unit cell 11 can be thereby prevented. This embodiment is particularly advantageous if the case 26 is composed of resin. This is because the case 26 composed of resin is readily deflected. Although various types of pressuring means 24 can be used as described above, the simple inexpensive spacer should be preferably employed as illustrated in FIG. 2. In this case, the pressuring means 24 or spacer, which is disposed in the gap between one case 26 and the inner wall, accommodating the cases 26, of the outer frame 28, can compact the cases 26 in a predetermined direction P. In the configuration of this embodiment, two or more cases 26 are disposed as illustrated in FIG. 2. A group 26a of two or more arrayed cases 26 is particularly preferred. This is the configuration of a so-called battery module. In this case, the pressuring means 24 is disposed outside the group of cases 26a. The entire group of cases 26a is preferably pressed by the pressuring means 24 and thus deflected such that the unit cells 11 are compacted. Since one pressuring means 24 disposed around the inner wall of the outer frame 28 can press the entire group of cases 26a including multiple cases 26, the space can be efficiently used. In the case that the secondary zinc battery simply includes, for example, one unit cell, the pressuring means 24 consisting of two metal plates is provided to hold the case 26 accommodating the unit cell 11 and compact the unit cell 11 in the predetermined direction P as illustrated in FIG. 4. This is also preferred because a simpler configuration can be achieved.

Alternatively, the pressuring means 24 may be disposed inside the case 26 as illustrated in FIG. 3 because the pressuring means 24 may be a simple inexpensive spacer. The spacer may come into contact with the electrolytic solution. Thus, the spacer is preferably composed of the resin that has resistance against alkali metal hydroxide, for example, potassium hydroxide, like the case 26. In particular, the unit cell 11 (in particular, electrode groups of the unit cell 11) expands in a direction E during a charge or discharge mode and has a larger thickness, as illustrated in FIG. 3. This expansion can be blocked by the pressuring means 24 or spacer having the same area as that of the active material layer in each electrode group, resulting in compaction of the unit cell 11 in the predetermined direction P. In the case 26 designed to have a similar size as the unit cell 11 (in particular, each electrode group of the cell 11), the inner wall itself of the case 26 can also apply a force resisting the expansion of the unit cell 11 (in particular, the electrode groups) and thus compact the unit cell 11 without a spacer (In this case, the case 26 itself can serve as a pressuring means). In contrast, the case 26 provided with a spacer can locally compact only the active materials of the electrodes.

LDH Separator

The LDH separator 22 contains layered double hydroxide (LDH). The LDH separator 22 incorporated into a secondary zinc battery separates a positive-electrode plate from a negative-electrode plate and can conduct hydroxide ions. In other words, the LDH separator 22 is a hydroxide-ion-conductive separator. The LDH separator 22 is preferably gas-impermeable and/or water-impermeable. In other words, the LDH separator 22 is preferably dense enough to be gas-impermeable and/or water-impermeable. The term "gas-impermeable" in this specification indicates that a tested object exposed to helium gas at a differential pressure of 0.5 atm on one side of the object blocks passage of the helium gas to the other side in water and thus no bubble is generated, as defined in Patent Documents 2 and 3. The term "water-impermeable" in this specification indicates that water in contact with one side of the tested object does not permeate to the other side as defined in Patent Documents 2 and 3. In other words, the gas-impermeable and/or water-impermeable LDH separator 22 has high denseness that blocks gas or water and thus is not composed of a gas-permeable or water-permeable porous film or any other porous material. Thus, the LDH separator 22 selectively permits the migration of hydroxide ions by means of its hydroxide ion conductivity and can serve as a battery separator. Hence, the LDH separator 22 has a highly effective configuration to physically restrict the penetration of the zinc dendrites formed during the charge mode through the separator and prevent short circuiting between the positive electrode and the negative electrode. The hydroxide-ion-conductive LDH separator 22 permits the effective migration of hydroxide ions, which is required between the positive-electrode plate and the negative-electrode plate. The LDH separator 22 can achieve reactions in the positive-electrode plate and negative-electrode plate during the charge and discharge modes.

The LDH separator 22 preferably has a He permeability per unit area of 10 cm/min·atm or less, more preferably 5.0 cm/min·atm or less, further preferably 1.0 cm/min·atm or less. The LDH separator having a He permeability of 10 cm/min·atm or less can effectively restrict the migration of Zn (typically zinc ions or zincate ions) in the electrolytic solution. The separator of the present embodiment can significantly restrict the migration of Zn. The restriction of the migration of zinc through the separator can effectively restrict the growth of the zinc dendrites in a secondary zinc battery by principle of operation. The He permeability is measured through a step of supplying a He gas to one side of the separator to cause the He gas to pass through the separator and a step of calculating the He permeability to evaluate the denseness of the separator. The He permeability is calculated according to an expression F/(P×S), where F represents the volume of the passing He gas per unit time, P a differential pressure applied to the separator during the passage of the He gas, and S a membrane area through which the He gas passes. The measured He permeability can provide a high level of evaluation of the denseness of the separator. For example, whether the separator has high denseness can be effectively evaluated. The separator having such high denseness blocks the migration of substances other than hydroxide ions, in particular, zinc causing growth of zinc dendrites as much as possible or permits only an infinitesimal volume of such substances to migrate: the He gas has the smallest atomic size among gaseous atoms and molecules and has an extremely low reactivity. In other words, He atoms can be present in a gaseous form without constructing molecules. In contrast, hydrogen present in a gaseous form consists of $H_2$ molecules. A gaseous He atom is smaller than a gaseous $H_2$ molecule. The gaseous $H_2$ is inherently flammable and thus hazardous. The He gas permeation rate defined by the expression above can be used for a simple and objective measure of the denseness regardless of differences in dimensions of samples and conditions for measurement. Whether the separator has high denseness suitable for use in a secondary zinc battery can be thereby evaluated in a simple, safe, and effective way. The He permeability can be measured in a preferred manner according to the steps in Evaluation 7 in Example 1, which will be described below.

As is generally known, the LDH is composed of a plurality of basic hydroxide layers and intermediate layers interposed between these basic hydroxide layers. The basic hydroxide layers are each mainly composed of metallic elements (typically metallic ions) and OH groups. The intermediate layers of the LDH are each composed of anions and $H_2O$. The anions are monovalent or multivalent anions, preferably monovalent or divalent ions. Preferably, the anions in the LDH include $OH^-$ and/or $CO_3^{2-}$. The LDH has high ionic conductivity based on its inherent properties.

The known LDH is generally represented by the basic formula $M^{2+}_{1-x}M^{3+}_x(OH)_2A^{n-}_{x/n}\cdot mH_2O$, where $M^{2+}$ is a divalent cation, $M^{3+}$ is a trivalent cation, $A^{n-}$ is an n-valent anion, n is an integer of 1 or more, x ranges from 0.1 to 0.4, and m is 0 or more. In this basic formula, $M^{2+}$ may be any divalent cation. Preferred examples of such a cation include $Mg^{2+}$, $Ca^{2+}$ and $Zn^{2+}$. A more preferred example is $Mg^{2+}$. $M^{3+}$ may be any trivalent cation. Preferred examples of such a cation include $Al^{3+}$ and $Cr^{3+}$. A more preferred example is $Al^{3+}$. $A^{n-}$ may be any anion. Preferred examples of such an anion include $OH^-$ and $CO_3^{2-}$. In the basic formula, $M^{2+}$ preferably includes $Mg^{2+}$. $M^{3+}$ preferably includes $Al^{3+}$. $A^{n-}$ preferably includes $OH^-$ and/or $CO_3^{2-}$. In the formula, n is an integer of 1 or more and is preferably 1 or 2; x ranges from 0.1 to 0.4, preferably ranges from 0.2 to 0.35; and m is any number that indicates the molar number of the water where m is a real number of 0 or more, typically a real number above 0, preferably 1 or more. It should be noted that the basic formula is an exemplary representation of the LDH. The ion species in the formula may be appropriately replaced with any other ion species. For example, the $M^{3+}$ ions may be at least partly replaced with quadrivalent or higher valent cations in the basic formula. In such a case, the coefficient x/n of the anion $A^{n-}$ in the formula may be appropriately varied.

For example, the basic hydroxide layers of the LDH may be composed of Ni, Ti, OH groups and optional incidental impurities. The intermediate layers of the LDH are composed of anions and $H_2O$ as described above. Although the alternately stacked structure itself of basic hydroxide layers and intermediate layers is basically the same as the commonly known alternately stacked structure of the LDH, the LDH of the embodiment, which is composed of the basic hydroxide layers mainly having Ni, Ti, and OH groups of LDH, can exhibit high alkaline resistance. Although the reason is not clear, it is believed that no element (for example, Al) easily dissolved in an alkaline solution is intentionally added to the LDH of the embodiment. Nevertheless, the LDH of the embodiment can also exhibit high ionic conductivity suitable for separators for alkaline secondary batteries. Ni in the LDH can have the form of nickel ions. Although nickel ions in the LDH are typically believed to be $Ni^{2+}$, they may be present in any other valence, for example, $Ni^{3+}$. Ti in the LDH can have the form of titanium ions. Although titanium ions in the LDH are typically believed to be $Ti^{4+}$, they may be present in any other valence, for example, $Ti^{3+}$. Each of the incidental impurities is any element which may be inevitably mixed in a manufacturing process, and it may be mixed into the LDH from, for example, a raw material or a substrate. As described above, it is impractical or impossible to strictly specify the LDH with a general formula since valences of Ni and Ti are not necessarily confirmed. Assuming that the basic hydroxide layers are mainly composed of $Ni^{2+}$, $Ti^{4+}$ and OH groups, the basic composition of the corresponding LDH can be represented by the general formula: $Ni^{2+}_{1-x}Ti^{4+}_x(OH)_2A^{n-}_{2x/n}\cdot mH_2O$, wherein $A^{n-}$ is an n-valent anion, n is an integer of 1 or more, preferably 1 or 2, x is above 0 to below 1, preferably 0.01 to 0.5, and m is a real number of 0 or more, typically a real number above 0 or 1 or more. However, it should be understood that the general formula indicates merely the "basic composition", and it may be replaced with other elements or ions (including elements with other valences of the same element, or elements or ions that may be unavoidably mixed in the manufacturing process) to such an extent that the elements such as $Ni^{2+}$, and $Ti^{4+}$ do not impair the basic properties of LDH.

Alternatively, the basic hydroxide layers of LDH may be composed of Ni, Al, Ti and OH groups. The intermediate layers are composed of anions and $H_2O$ as described above. Although the alternately stacked structure itself of basic hydroxide layers and intermediate layers is basically the same as the generally known alternately stacked structure of LDH, the LDH of the embodiment, which is composed of the basic hydroxide layers mainly having Ni, Al, Ti and OH groups of LDH, can exhibit high alkaline resistance. Although the reason is not clear, it is believed that Al, which has been considered to be easily dissolved in an alkaline solution, is hard to be dissolved in the alkaline solution due to some interaction with Ni and Ti. Nevertheless, the LDH of the embodiment can also exhibit high ionic conductivity suitable for separators for alkaline secondary batteries. Ni in the LDH can have the form of nickel ions. Although nickel ions in the LDH are typically believed to be $Ni^{2+}$, they may be present in any other valence, for example, $Ni^{3+}$. Al in the LDH can have the form of aluminum ions. Although aluminum ions in the LDH are typically believed to be $Al^{3+}$, they may be present in any other valence. Ti in the LDH can have the form of titanium ions. Although titanium ions in the LDH are typically believed to be $Ti^{4+}$, they may be present in any other valence, for example, $Ti^{3+}$. The basic hydroxide layers may contain other elements or ions as long as they contain Ni, Al, Ti and OH groups. However, the basic hydroxide layers preferably contain Ni, Al, Ti and OH groups as main constituent elements. That is, it is preferred that the basic hydroxide layers are mainly composed of Ni, Al, Ti and OH groups. Accordingly, the basic hydroxide layers are typically composed of Ni, Al, Ti, OH groups and optional incidental impurities. Each of the incidental impurities is any element which may be inevitably mixed in a manufacturing process, and it may be mixed into the LDH from, for example, a raw material or a substrate. As described above, it is impractical or impossible to strictly specify the LDH with a general formula since valences of Ni, Al and Ti are not necessarily confirmed. Assuming that the basic hydroxide layers are mainly composed of $Ni^{2+}$, $Al^{3+}$, $Ti^{4+}$ and OH groups, the basic composition of the corresponding LDH can be represented by the general formula: $Ni^{2+}_{1-x-y}Al^{3+}_{x}Ti^{4+}_{y}(OH)_2 A^{n-}_{(x+2y)/n} \cdot mH_2O$, wherein $A^{n-}$ is an n-valent anion, n is an integer of 1 or more, preferably 1 or 2, x is above 0 to below 1, preferably 0.01 to 0.5, y is above 0 to below 1, preferably 0.01 to 0.5, x+y is above 0 to below 1, and m is a real number of 0 or more, typically a real number of above 0 or 1 or more. However, it should be understood that the general formula indicates merely the "basic composition", and it may be replaced with other elements or ions (including elements with other valences of the same element, or elements or ions that may be unavoidably mixed in the manufacturing process) to such an extent that the elements such as $Ni^{2+}$, $Al^{3+}$ and $Ti^{4+}$ do not impair the basic properties of LDH.

The porous substrate has water-permeability and gas-permeability. It should be appreciated that the porous substrate incorporated into the secondary zinc battery permits the electrolytic solution to reach the LDH. The LDH separator including the porous substrate can stably hold hydroxide ions. The LDH separator 22 of the porous substrate has high strength and can be thinned to have a low electrical resistance.

As described above, the LDH separator 22 includes (or is typically composed of) the LDH and the porous substrate. The pores of the porous substrate are filled with the LDH, so that the LDH separator 22 has hydroxide ion conductivity and gas impermeability (and thus function as the LDH separator exhibiting hydroxide ion conductivity). It is particularly preferred that the LDH be incorporated into the porous substrate over the entire thickness thereof. The LDH separator 22 preferably has a thickness of 5 to 200 μm, more preferably 5 to 100 μm, further preferably 5 to 30 μm.

The porous substrate is composed of a polymeric material. The polymeric porous substrate has the following advantages: 1) high flexibility (thus, the porous substrate cannot break even if it is thinned), 2) high porosity, 3) high ion conductivity (a thinned porous substrate can still have a high porosity), and 4) ease of production and handling of a substrate. The advantage 1) high flexibility leads to an additional advantage 5) ready folding of one LDH separator 22 or hermetic joining of two LDH separators 22. The LDH separator 22 including the polymeric porous substrate can have at least one closed edge (a folded LDH separator is further advantageous in that sealing of one edge of the LDH separator is not necessary). Preferred examples of the polymeric material include polystyrene, polyethersulfone, polypropylene, epoxy resin, poly(phenylene sulfide), hydrophilized fluororesin (such as tetrafluoro resin: PTFE), cellulose, nylon, polyethylene and any combination thereof. All these preferred materials have high resistance to the alkaline electrolytic solution of the battery. Further preferred polymeric materials are polyolefins such as, for example, polypropylene, polyethylene, most preferably polypropylene from the viewpoint of high resistance to hot water, high acid resistance and high alkaline resistance, as well as low cost. When the porous substrate is composed of the polymeric material, it is more preferred that the LDH layer is embedded into the entire porous substrate over the thickness (for example, most or substantially all of the pores inside the porous substrate are filled with the LDH). The preferred thickness of the polymeric porous substrate in this case is 5 to 200 μm, more preferably 5 to 100 μm, most preferably 5 to 30 μm. A usable polymeric porous substrate may be a microporous membrane commercially available as a separator for lithium batteries. Alternatively, the polymeric porous substrate may be commercially available cellophane.

The porous substrate has preferably a mean pore diameter of at most 100 μm, more preferably at most 50 μm, for example, typically 0.001 to 1.5 μm, more typically 0.001 to 1.25 μm, further more typically 0.001 to 1.0 μm, particularly typically 0.001 to 0.75 μm, most typically 0.001 to 0.5 μm. Within these ranges, a dense LDH separator having gas-impermeability can be formed while the porous substrate keeps desirable water-permeability and required strength as a support. In the present invention, the mean pore size can be determined by measuring the largest dimension of each pore based on the electron microscopic image of the surface of the porous substrate. The electron microscopic image is measured at 20,000-fold magnification or more. All the observed pore diameters are sorted in order of size to calculate the mean value, and 30 points in total per one observed field, i.e., 15 higher points and 15 lower points from the mean value are averaged on two observed fields of views to determine the mean pore size. In the measurement, a dimension measuring function in software of SEM or image analyzing software (for example, Photoshop manufactured by Adobe) can be used.

The porous substrate has a porosity of preferably 10 to 60%, more preferably 15 to 55%, most preferably 20 to 50%. Within these ranges, a dense LDH separator having gas-impermeability can be formed while the porous substrate keeps desirable water permeability and required strength as a support. The porosity of the porous substrate can be preferably measured by Archimedes' method. In the case where the porous substrate is composed of the polymeric material and the LDH is embedded over the region of the porous substrate in the thickness direction, the porosity of the porous substrate is preferably 30 to 60%, more preferably 40 to 60%.

The LDH separator 22 can be produced by any method. The LDH separator 22 can be produced by appropriately modifying conditions of a known method for producing LDH containing functional layers and composite materials (see, for example, Patent Documents 1 to 3). For example, the LDH containing functional layer and the composite material (in other words, the LDH separator) can be produced by (1) providing a porous substrate, (2) applying a titanium oxide sol or a mixed sol of alumina and titania onto the porous substrate and then heating the sol to form a titanium oxide layer or an alumina/titania layer, (3) immersing the porous substrate into an aqueous raw material solution containing nickel ions ($Ni^{2+}$) and urea, and (4) hydrothermally treating the porous substrate in the aqueous raw material solution to form the LDH containing functional layer on the porous substrate and/or in a porous substrate. In particular, in Step (2), forming the titanium oxide layer or the alumina/titania layer on the porous substrate can not only produce a raw material for the LDH, but also serve as a seed of LDH crystalline growth and uniformly form the LDH containing functional layer that is highly densified on the surface of the porous substrate. In addition, in Step (3), the presence of urea raises the pH value through generation of ammonia in the solution through the hydrolysis of urea, and gives the LDH by formation of hydroxide with coexisting metal ions. Also, generation of carbon dioxide in hydrolysis gives the LDH of a carbonate anion type.

In particular, the composite material (in other words, the LDH separator) in which the porous substrate is composed of a polymeric material and the functional layer is embedded over the porous substrate in the thickness direction is produced by applying the mixed sol of alumina and titania to the substrate in Step (2) in such that the mixed sol permeates into all or most area of the interior pores of the substrate. By this manner, most or substantially all pores inside the porous substrate can be embedded with the LDH. Examples of preferred application include dip coating and filtration coating. Particularly preferred is dip coating. The amount of the deposited mixed sol can be varied by adjusting the number of times of coating such as dip coating. The substrate coated with the mixed sol by, for example, dip coating may be dried and then subjected to Steps (3) and (4).

EXAMPLE

A LDH separator usable in the present invention will now be described more specifically by way of the following Example.

Example 1

A LDH separator that included LDH containing Ni, Al, and Ti was made from a polymeric porous substrate according to the following steps and was evaluated.

(1) Provision of Polymeric Porous Substrate

A commercially available porous polypropylene substrate having a porosity of 50%, a mean pore diameter of 0.1 μm, and a thickness of 20 μm was cut into dimensions of 2.0 cm by 2.0 cm.

(2) Coating of Polymeric Porous Substrate with Sol of Alumina and Titania

An amorphous alumina solution (Al-ML15 available from Taki Chemical Co., Ltd.) and a titanium oxide sol solution (M6 available from Taki Chemical Co., Ltd.) were mixed into a mixed sol having a Ti/Al molar ratio of 2. The mixed sol was applied by dip coating to the cut substrate provided in Process (1). The dip coating process involved immersing the cut substrate in 100 ml of mixed sol, vertically pulling up the substrate from the mixed sol, and drying the substrate in a dryer for five minutes at 90° C.

(3) Preparation of Aqueous Stock Solution

Nickel nitrate hexahydrate ($Ni(NO_3)_2 \cdot 6H_2O$, available from Kanto Chemical Co., Inc.) and urea (($NH_2)_2CO$, available from Sigma-Aldrich) were provided for production of an aqueous stock solution. Weighed nickel nitrate hexahydrate was placed in a beaker, and deionized water was added to the beaker to produce 75 ml solution in a concentration of 0.015 mol/L. While the resultant solution was stirred, weighed urea was added to the solution such that the urea/$NO_3^-$ molar ratio was 16 to yield an aqueous stock solution.

(4) Formation of Membrane by Hydrothermal Treatment

The aqueous stock solution and the substrate after the dip coating were encapsulated in a closed Teflon® container (an autoclave having a volume of 100 ml and covered with a stainless-steel jacket). The substrate was horizontally fixed in the solution such that two sides of the substrate were in contact with the solution in the closed Teflon® container. The substrate was then subjected to a hydrothermal treatment for 24 hours at 120° C. to form LDH on and in the substrate. After the elapse of a predetermined time, the substrate was retrieved from the closed container and washed with deionized water. The substrate was dried for ten hours at 70° C., resulting in a LDH incorporated in the porous substrate. The LDH separator was thereby produced.

(5) Evaluation

The produced LDH separator was subjected to the following evaluations:

Evaluation 1: Identification of LDH separator

The crystalline phase of the LDH separator was measured with an X-ray diffractometer (RINT TTR III manufactured by Rigaku Corporation) at a voltage of 50 kV, a current of 300 mA, and a measuring range of 10° to 70° to give an XRD profile. The resultant XRD profile was identified with the diffraction peaks of LDH (hydrotalcite compound) described in JCPDS card NO. 35-0964.

Evaluation 2: Observation of Microstructure

The surface microstructure of the LDH separator was observed at an accelerating voltage of 10 to 20 kV with a scanning electron microscope (SEM, JSM-6610LV, manufactured by JEOL Ltd.). After preparation of a cross-sectional polished surface of the LDH separator with an ionic milling system (IM4000, manufactured by Hitachi High-Technologies Corporation), the microstructure of the cross-sectional polished surface was observed with the SEM under the same conditions.

Evaluation 3: Elemental Analysis (EDS)

The LDH separator was polished across the thickness for observation with a cross-sectional polisher (CP). A field of cross-sectional image of the LDH separator was observed with a 10,000-fold magnification with FE-SEM (ULTRA 55, manufactured by Carl Zeiss). The pure LDH membrane above the substrate surface and the LDH portion (by point analysis) inside the substrate in this cross-sectional image was subjected to elemental analysis at an accelerating voltage of 15 kV with an EDS analyzer (NORAN System SIX, manufactured by Thermo Fisher Scientific Inc.).

Evaluation 4: Evaluation of Alkaline Resistance

Zinc oxide was dissolved in 6 mol/L of aqueous potassium hydroxide solution to yield 5 mol/L of aqueous potassium hydroxide solution that contained 0.4 mol/L of zinc oxide. In the next stage, 15 mL of the resultant aqueous potassium hydroxide solution was placed in a closed container made of Teflon®. The LDH separator having dimensions of 1 cm×0.6 cm was placed on the bottom of the closed container, and the cover was closed. The LDH separator was held at 70° C. for three weeks or 504 hours, or seven weeks or 1176 hours and then retrieved from the closed container. The LDH separator was dried overnight at room temperature. The microstructure of the resultant sample was observed with SEM and the crystalline structure was analyzed with XRD.

Evaluation 5: Measurement of Ionic Conductivity

Figure 7:
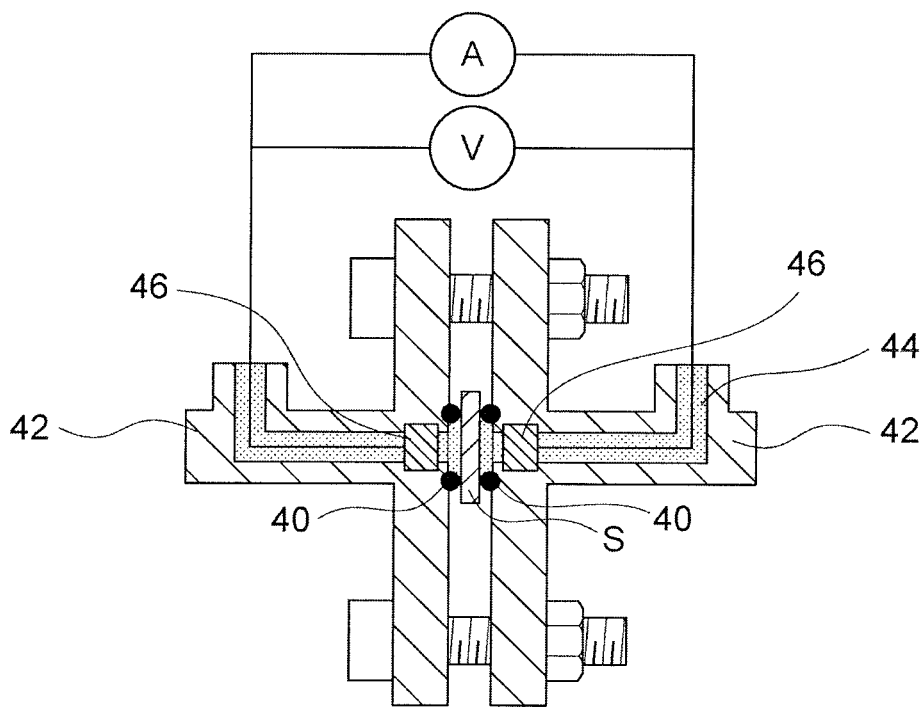
FIG. 7 is a schematic cross-sectional view illustrating an electrochemical measurement system used in Example 1.

The conductivity of the LDH separator in the electrolytic solution was measured with an electrochemical measurement system shown in FIG. 7. A LDH separator sample S was held between two silicone gaskets 40 having a thickness of 1 mm and assembled into a PTFE flange-type cell 42 having an inner diameter of 6 mm. Electrodes 46 made of #100 nickel wire mesh were assembled into a cylinder having a diameter of 6 mm in the cell 42, and the distance between the electrodes was 2.2 mm. The cell 42 was filled with an aqueous electrolytic solution 44 containing 6M potassium hydroxide. Using electrochemical measurement system (potentio-galvanostat frequency responsive analyzers 1287A and 1255B manufactured by Solartron), the sample was observed under the conditions of a frequency range of 1 MHz to 0.1 Hz and an applied voltage of 10 mV, and the resistance of the LDH separator sample S was determined from the intercept across a real number axis. The resistance of the porous substrate without the LDH membrane was also measured in the same manner. The resistance of the LDH membrane was determined from the difference in resistance between the LDH separator sample S and the substrate. The conductivity was determined with the resistance, the thickness, and the area of the LDH membrane.

Evaluation 6: Determination of Denseness

Figure 8A:
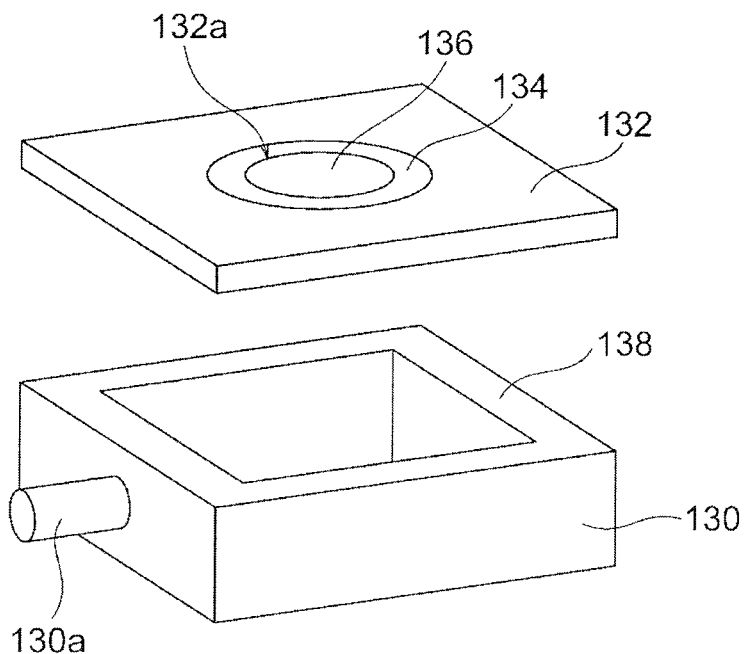
FIG. 8A is an exploded perspective view of a closed container used in the determination of denseness in Example 1.
Figure 8B:
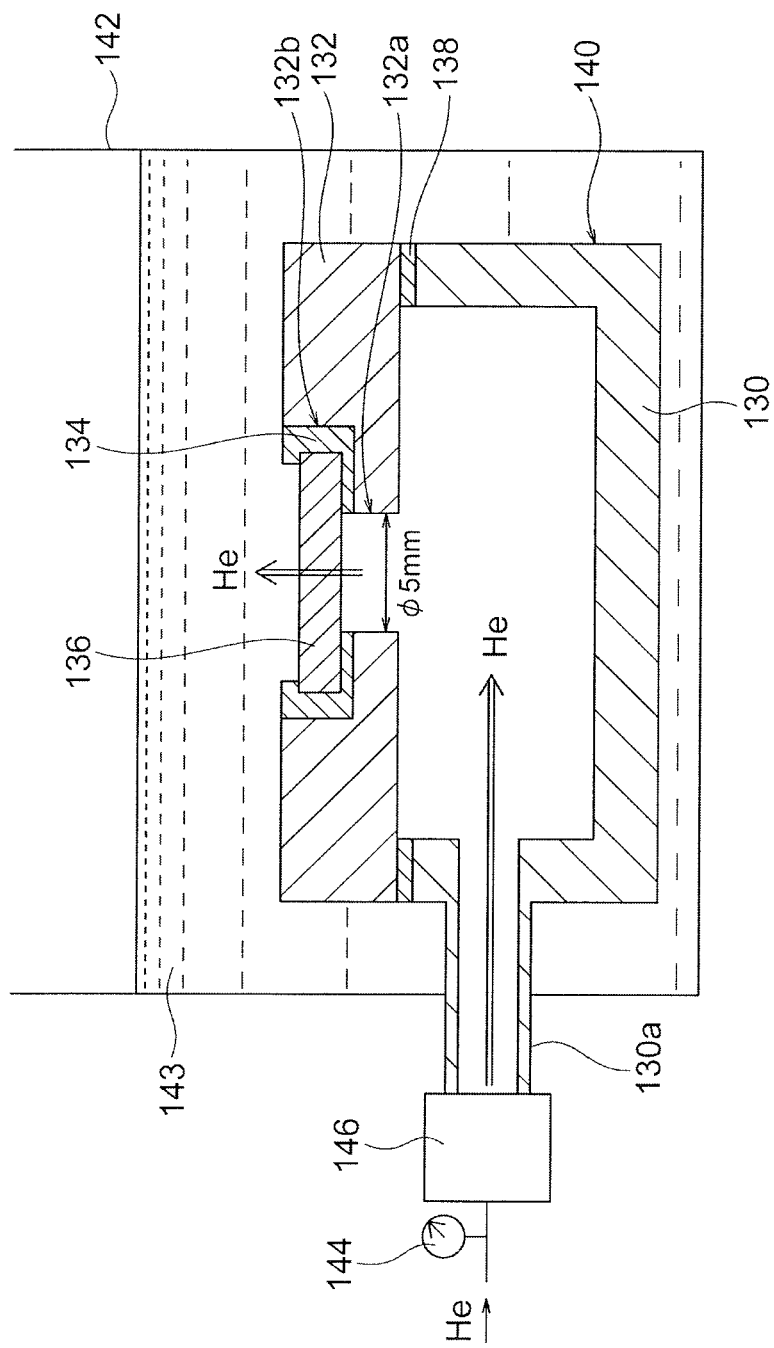
FIG. 8B is a schematic cross-sectional view of the measurement system used in the determination of denseness in Example 1.

The denseness was determined to confirm that the LDH separator had denseness with gas-impermeability. As shown in FIGS. 8A and 8B, an open acrylic container 130 and an alumina jig 132 with a shape and dimensions capable of working as a cover of the acrylic container 130 were provided. The acrylic container 130 was provided with a gas supply port 130a. The alumina jig 132 had an opening 132a having a diameter of 5 mm and a cavity 132b surrounding the opening 132a for placing the sample. An epoxy adhesive 134 was applied onto the cavity 132b of the alumina jig 132. A LDH separator sample 136 was placed into the cavity 132b and bonded to the alumina jig 132 in an air-tight and liquid-tight manner. The alumina jig 132 with the LDH separator sample 136 was then bonded to the upper end of the acrylic container 130 in an air-tight and liquid-tight manner with a silicone adhesive 138 to completely seal the open portion of the acrylic container 130. A closed container 140 was thereby completed for the measurement. The closed container 140 for the measurement was placed in a water vessel 142 and the gas supply port 130a of the acrylic container 130 was connected to a pressure gauge 144 and a flow meter 146 so that helium gas was supplied into the acrylic container 130. Water 143 was poured in the water vessel 142 to completely submerge the closed container 140 for the measurement. At this time, the air-tightness and liquid-tightness were sufficiently kept in the interior of the closed container 140 for the measurement, and one side of the LDH separator sample 136 was exposed to the internal space of the closed container 140 for the measurement while the other side of the LDH separator sample 136 was in contact with water in the water vessel 142. In this state, helium gas was introduced into the acrylic container 130 of the closed container 140 for the measurement through the gas supply port 130a. The pressure gauge 144 and the flow meter 146 were controlled such that the differential pressure between the inside and outside of the LDH separator sample 136 reached 0.5 atm (that is, the pressure of the helium gas is 0.5 atm higher than the water pressure applied to the LDH separator sample 136). Bubbling of helium gas in water from the LDH separator sample 136 was observed. If bubbling of helium gas was not observed, the LDH separator sample 136 was determined to have high denseness with gas-impermeability.

Evaluation 7: Helium Permeability

Figure 9A:
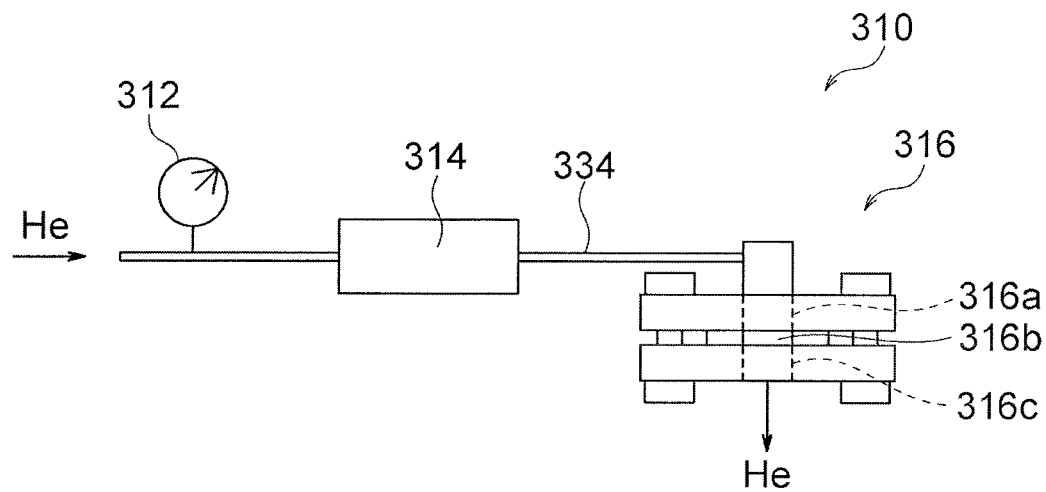
FIG. 9A is a schematic view illustrating an exemplary helium permeability measurement system used in Example 1.
Figure 9B:
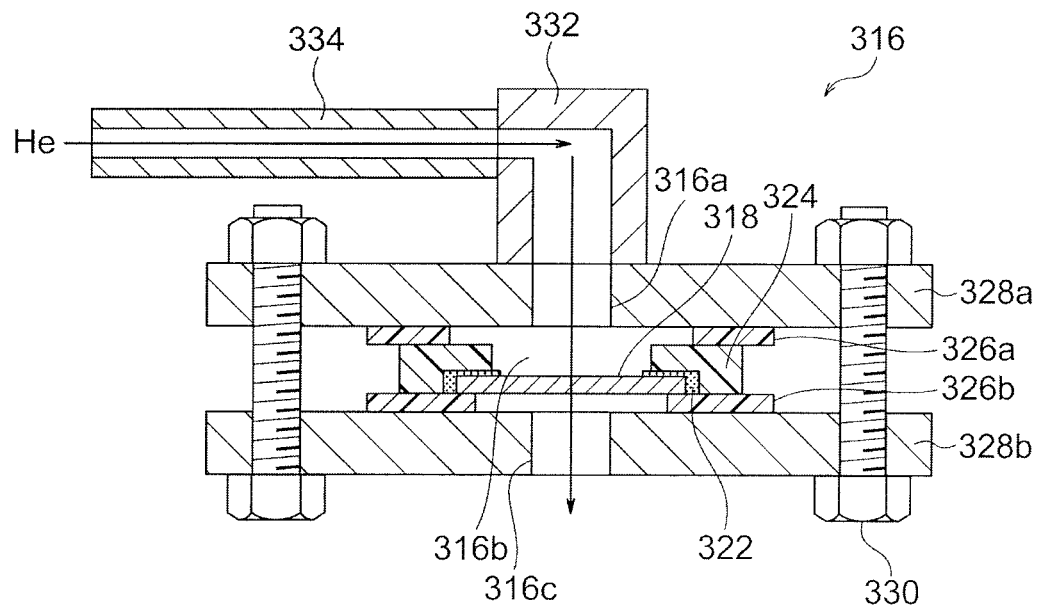
FIG. 9B is a schematic cross-sectional view of a sample holder and its peripheral configuration used in the measurement system illustrated in FIG. 9A.

A helium permeation test was conducted to evaluate the denseness of the LDH separator from the viewpoint of helium permeability. The helium permeability measurement system 310 shown in FIGS. 9A and 9B was constructed. The helium permeability measurement system 310 was configured to supply helium gas from a gas cylinder filled with helium gas to a sample holder 316 through the pressure gauge 312 and a flow meter 314 (digital flow meter), and to discharge the gas by permeating from one side to the other side of a LDH separator 318 held by the sample holder 316. The sample holder 316 had a structure including a gas supply port 316a, a sealed space 316b and a gas discharge port 316c, and was assembled as follows: An adhesive 322 was applied along the outer periphery of the LDH separator 318 and bonded to a jig 324 (made of ABS resin) having a central opening. Gaskets or sealing members 326a, 326b made of butyl rubber were disposed at the upper end and the lower end, respectively, of the jig 324, and then the outer sides of the members 326a, 326b were held with supporting members 328a, 328b (made of PTFE) each having an opening and one having a flange. Thus, the sealed space 316b was partitioned by the LDH separator 318, the jig 324, the sealing member 326a, and the supporting member 328a. The supporting members 328a and 328b were tightly fastened to each other with fastening means 330 with screws not to cause leakage of helium gas from portions other than the gas discharge port 316c. A gas supply pipe 334 was connected to the gas supply port 316a of the sample holder 316 assembled as above through a joint 332.

Helium gas was then supplied to the helium permeability measurement system 310 via the gas supply pipe 334, and the gas was permeated through the LDH separator 318 held in the sample holder 316. A gas supply pressure and a flow rate were then monitored with a pressure gauge 312 and a flow meter 314. After permeation of helium gas for one to thirty minutes, the helium permeability was calculated. The helium permeability was calculated from the expression of $F/(P \times S)$ where F ($cm^3$/min) was the volume of permeated helium gas per unit time, P (atm) was the differential pressure applied to the LDH separator when helium gas permeated through, and S ($cm^2$) was the area of the membrane through which helium gas permeates. The permeation rate F ($cm^3$/min) of helium gas was read directly from the flow meter 314. The gauge pressure read from the pressure gauge 312 was used for the differential pressure P. Helium gas was supplied such that the differential pressure P was within the range of 0.05 to 0.90 atm.

(6) Results of Evaluations

The results of the evaluations were as follows:

Rating 1: The observed XRD profile indicates that the crystalline phase of the LDH separator is confirmed to be the LDH (hydrotalcite compound).

Figure 10:
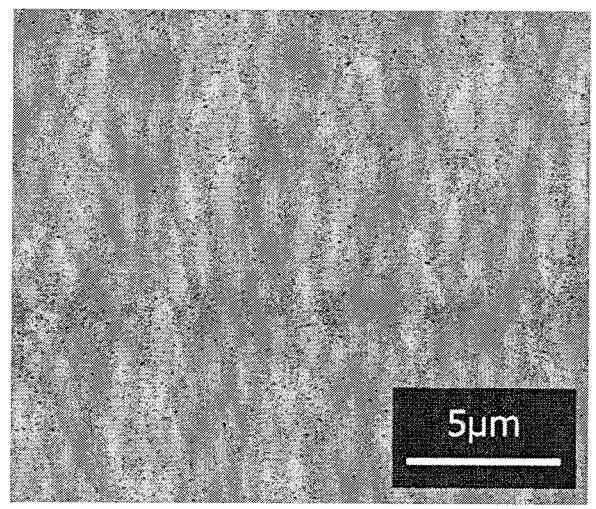
FIG. 10 is an SEM image showing the surface microstructure of the LDH separator produced in Example 1.

Rating 2: As shown in the SEM image of the surface microstructure of the LDH separator in FIG. 10, the LDH is incorporated into the porous substrate over the entire thickness thereof, in other words, the pores of the porous substrate are uniformly filled with the LDH.

Rating 3: The results of EDS elemental analysis indicate that C, Al, Ti, and Ni that are constituent elements of the LDH are detected from the LDH separator. Al, Ti, and Ni are constituent elements of the basic hydroxide layer while C corresponds to $CO_3^{2-}$ that is an anion constituting the intermediate layer of the LDH.

Rating 4: no change in the microstructure of the LDH separator is observed even after immersion in the aqueous potassium hydroxide solution at 70° C. for three weeks or seven weeks.

Rating 5: The ionic conductivity of the LDH separator was 2.0 mS/cm.

Rating 6: The LDH separator was confirmed to have high denseness with gas-impermeability.

Rating 7: Helium permeability through the LDH separator was 0.0 cm/min·atm.

What is claimed is:

1. A secondary zinc battery comprising:
   (a) at least one unit cell comprising;
      a positive electrode;
      a negative-electrode structure comprising a negative-electrode active material layer comprising at least one selected from the group consisting of elemental zinc, zinc oxide, zinc alloys, and zinc compounds;
      a layered double hydroxide (LDH) separator comprising a porous substrate composed of a polymeric material and LDH, pores of the porous substrate being filled with the LDH such that the LDH separator is hydroxide-ion-conductive and gas-impermeable, the LDH separator separating the positive electrode from the negative-electrode active material layer; and
      an electrolytic solution; and
   (b) a pressuring unit compacting the unit cell to bring the negative-electrode structure in close contact with the LDH separator.

2. The secondary zinc battery according to claim 1, wherein compaction by the pressuring unit brings the LDH separator into contact with an entire surface of the negative-electrode structure without gaps.

3. The secondary zinc battery according to claim 1, wherein the secondary zinc battery further comprises at least one case accommodating the unit cell.

4. The secondary zinc battery according to claim 3, wherein the at least one unit cell comprises two or more unit cells, the unit cells being accommodated in the respective cases.

5. The secondary zinc battery according to claim 3, wherein the pressuring unit is disposed outside the at least one case to externally press and deflect the case such that the unit cells are compacted.

6. The secondary zinc battery according to claim 3, wherein the at least one case comprises a group of two or more arrayed cases, the pressuring unit being disposed outside the group of cases, the pressuring unit pressing and deflecting the entire group of cases such that the unit cells are compacted.

7. The secondary zinc battery according to claim 3, wherein the pressuring unit is disposed inside the case.

8. The secondary zinc battery according to claim 1, wherein the negative-electrode structure further comprises a liquid retention material that covers or wraps around the negative-electrode active material layer.

9. The secondary zinc battery according to claim 8, wherein the liquid retention material is a non-woven fabric.

10. The secondary zinc battery according to claim 1, wherein the LDH is incorporated into the porous substrate over the entire thickness thereof.

11. The secondary zinc battery according to claim 1, wherein the negative-electrode structure further comprises a current collector.

12. The secondary zinc battery according to claim 11, wherein the current collector is a copper foil or an expanded copper metal.

13. The secondary zinc battery according to claim 1, wherein the secondary zinc battery is a secondary nickel-zinc battery comprising the positive electrode that comprises nickel hydroxide and/or nickel oxyhydroxide.

14. The secondary zinc battery according to claim 1, wherein the secondary zinc battery is a zinc-air secondary battery comprising the positive electrode that is an air electrode.

* * * * *